(12) United States Patent
Koopmann et al.

(10) Patent No.: US 6,429,573 B2
(45) Date of Patent: Aug. 6, 2002

(54) SMART MATERIAL MOTOR WITH MECHANICAL DIODES

(75) Inventors: Gary H. Koopmann; Chen Weicheng; George A. Lesieutre; Jeremy Frank; Eric Mockensurm, all of State College, PA (US)

(73) Assignee: The Penn State Research Foundation, University Part, PA (US)

(*) Notice: Subject to any disclaimer, the term of this patent is extended or adjusted under 35 U.S.C. 154(b) by 0 days.

(21) Appl. No.: 09/886,520

(22) Filed: Jun. 21, 2001

Related U.S. Application Data
(60) Provisional application No. 60/213,751, filed on Jun. 23, 2000.

(51) Int. Cl.[7] .............................................. H01L 41/08
(52) U.S. Cl. .................. 310/328; 310/323.02; 310/331; 310/332
(58) Field of Search ................................ 310/330–332, 310/328, 323.01, 323.02

(56) References Cited

U.S. PATENT DOCUMENTS

| | | | |
|---|---|---|---|
| 3,138,749 A | | 6/1964 | Stibitz |
| 3,154,700 A | | 10/1964 | McNaney |
| 3,204,133 A | * | 8/1965 | Tschudin ..................... 310/330 |
| 3,292,019 A | | 12/1966 | Hsu et al. |
| 3,296,467 A | | 1/1967 | Locher |
| 3,377,489 A | | 4/1968 | Brisbane |
| 3,684,904 A | | 8/1972 | Galutva et al. |
| 3,902,084 A | | 8/1975 | May, Jr. |
| 3,902,085 A | | 8/1975 | Bizzigotti |
| 3,952,215 A | | 4/1976 | Sakitani |
| 4,056,743 A | * | 11/1977 | Clifford et al. ......... 310/330 X |
| 4,163,168 A | | 7/1979 | Ishikawa et al. |
| 4,219,755 A | | 8/1980 | O'Neill et al. |
| 4,453,103 A | * | 6/1984 | Vishnevsky et al. ........ 310/328 |
| 4,454,441 A | | 6/1984 | Taniguchi |
| 4,570,096 A | | 2/1986 | Hara et al. |
| 4,622,483 A | | 11/1986 | Staufenberg, Jr. et al. |
| 4,714,855 A | | 12/1987 | Fujimoto |
| 4,871,939 A | * | 10/1989 | Clouser ...................... 310/332 |
| 4,947,077 A | | 8/1990 | Murata |
| 5,286,199 A | * | 2/1994 | Kipke ..................... 310/328 X |
| 5,306,979 A | * | 4/1994 | Schwartz, Jr. .............. 310/328 |
| 5,332,942 A | | 7/1994 | Rennex |
| 5,530,312 A | * | 6/1996 | Teter et al. .................. 310/328 |

OTHER PUBLICATIONS

M. Bexell, *Characterization of an inchworm prottype motor*, 1993, Sensors and Actuators, A, 43 (1994) 322–329.

J. E. Meisner and J. P. Teter, "Piezoelectric/magnetostrictive resonant inchworm motor". SPIE, vol. 2190, pp. 520–527, 1994.

T. Funakubo, t. Tsubata, Y. Tanigughi, and K. Kumei. "Ultrasonic linear motor using multilayer piezoelectric actuators". *Japanese Journal of Applied Physics*, vol. 34, Part I, No. 5B, pp. 2756–2759, May, 1995.

T. Glenn, N. Hagoood. "Development of a two–sided piezo-electric rotary ultrasonic motor for high torque." Proceedings of SPIE Smart Structures Conference, v 3041. Mar. 3–6, pp. 326–338. 1997.

K. Uchino. *Piezoelectric Actuators and Ultrasonic Motors*, 1997, Smart Materials and Structures, vol. 7, No. 3, pp. 294–304, Jun. 1998.

BiZhang and Zhen Qi Zhu. "Design of an inchworm–type linear piezomotor", Precision Manufactering.

* cited by examiner

*Primary Examiner*—Mark O. Budd
(74) *Attorney, Agent, or Firm*—McKee, Voorhees & Sease, P.L.C.

(57) ABSTRACT

The present invention is actuator having a shaft delivering mechanical power to a load, a first active element adapted to be driven by an oscillating signal, and at least one mechanical diode operatively connected to the shaft in the act of development. A plurality of mechanical diodes may also be used. Mechanical diodes can be either rotary mechanical diodes or linear mechanical diodes. The mechanical diodes can also be bi-directional.

24 Claims, 8 Drawing Sheets

SMART MATERIAL MOTOR WITH MECHANICAL DIODES

CROSS-REFERENCE TO RELATED APPLICATIONS

This application is a continuation of co-pending provisional application U.S. No. 60/213,751 filed Jun. 23, 2000, the disclosure of which is hereby specifically incorporated by reference.

GRANT REFERENCE

Work for this invention was funded in part by a grant from the Advanced Research Projects Agency (ARPA), ARPA Orde No. E782/00. Work for this invention was further funded in part by a grant from the Defense Advanced Research Projects Agency (DARPA), DARPA Grant No. MDA972-97-3-0016. The government may have certain rights in this invention.

BACKGROUND OF THE INVENTION

Field of the Invention

This invention relates to motors and actuators. More specifically, this invention relates to the use of smart materials in actuators and motors.

Electric motors are used in an extremely wide variety of applications, and a competitive technology offering significant improvements could have tremendous market potential. Several shortcomings of electric motors include electric field generation, low torque density (torque output per motor volume), heat generation, and a heavy iron core. In certain high performance applications, a higher power density (power output per motor volume) than what is possible with electromagnetic (EM) motors is required. Recently, smart material piezoelectric motors have offered an alternative solution. However, the piezoelectric motor designs, both ultrasonic and quasi-static, have lacked the high torque and high power necessary for many applications. Moreover, the piezoelectric motor designs have generally been high-cost, and have not had good durability. The clamping mechanism of such motors typically has been the source of these limitations.

The phrases "smart material" and "active material" refer to a broad category of materials able to convert energy (usually electrical) to mechanical energy, and vice-versa. In the context of an actuator, a smart (or active) material is one that can perform mechanical work under action of an applied voltage, charge, magnetic field, or temperature change. The most commonly used smart material is PZT (Lead Zirconate Titanate), which uses the inverse piezoelectric effect to generate strains on the order of 0.1%. Other smart materials include: magnetostrictives, which generate similar strains under action of a magnetic field; shape memory alloys, which generate large strains as a temperature-induced phase change; and electroactive polymers, a more recent category of polymers with piezoelectric characteristics.

In the category of smart materials, piezoelectric materials have garnered the largest share of attention, especially in terms of industrial applications. Piezoelectric ceramics have several redeeming features, namely reliability, high energy density, high bandwidth, high stiffness, low price and accessibility, which make them a natural choice for solid state sensors and actuators.

As a result of "smart material" developments over the past 50 years, a new breed of motor has developed. Commonly known as "smart material motors" or "solid state motors", designs of these devices have gradually improved and are poised to compete with and surpass the performance of traditional motors (electromagnetic and hydraulic). The field of smart material motors can be subdivided into four categories: inchworm-type linear motors, ultrasonic linear motors, quasi-static rotary motors, and ultrasonic rotary motors.

The first smart material motors were of the inchworm-type. A common design feature of these devices is a quasi-static clamping and advancing of a moving element to generate motion resembling the way an inchworm walks. Since the motion of inchworm-type motors is quasi-static, it is most often used in small, stable, high precision applications with relatively high force and low speed requirements.

A second category of smart material motor is the ultrasonic linear motor. These motors are driven with a low voltage drive signal, usually on the order of 20–100 kHz, and are typified by high speed, low force operation. Motion is generated by exciting a structural resonance of a stator, which in turn generates an elliptic path of motion at the contact between the stator and slider. The elliptic oscillation can be generated several ways: a travelling wave excited on an elastic bar, synthesizing two degenerate standing waves, or synthesizing a standing wave and a nonresonant oscillation. When the stator and slider are pressed together, the elliptic motion on the stator pushes the slider in one direction.

A number of developments have also been made in the field of smart material rotary motors. While ultrasonic rotary motors have received most of the attention, a number of recent designs have applied the technology of the quasi-static inchworm concept to rotary motors. These motors are exceptional in terms of torque output, although usually quite slow.

Ultrasonic rotary motors, driven at resonance at frequencies ranging from 20 to 100 kHz, are more common in the literature than the three types presented so far. As small, lightweight, quiet alternatives to electromagnetic motors, ultrasonic motors are used in industrial applications such as camera lenses, printers, and floppy disk drives. Ultrasonic rotary motors, like ultrasonic linear motors, are divided into two classes by their mode of operation: standing-wave type, and propagating-wave type. Standing-wave motors are driven with a single frequency input and combine two excited resonant mode shapes, generating an elliptical path to drive a rotor. These motors have the potential of being low cost and highly efficient, but are limited to uni-directional motion. In contrast, propagating-wave motors require two vibration sources to generate two standing waves. The two standing waves are superimposed to form a propagating wave which generates elliptical motion and drives the rotor. Propagating-wave rotary motors have a lower potential efficiency, but do offer reversibility.

In the past, ultrasonic rotary motors have been used primarily in small, low torque positioning applications. Recently, some designs have offered high torque and power performance, but still have high energy losses due to friction.

Consulting a catalog of commercial motors under 100 hp (75 kW) leads to a rough power density of 100 W/kg for typical electric motors. Electric motors and piezoelectric material-based motors have an advantage over hydraulic systems in that power may be transferred over long distances with relatively light wires. As a rule, piezoelectric material-based motors have advantages over typical electric motors in that they offer better potential to conform with geometric requirements associated with tightly-integrated adaptive structures, and in the potential for reduced electromagnetic field generation.

Numerous problems exist regarding motors and actuators. These problems include the need for high specific power, reliability, life, and efficiency. Although these same problems exist in numerous applications, one specific area where these problems surface is in military applications. For example, although the military may be able to track moving targets it lacks the ability to pursue them. Agile high-speed weapons, for both air and marine systems, would address such a need and represent a new military capability. Compact, conformable high-power actuators are needed to enable such systems. High power density enables the high-bandwidth fin or thrust vectoring control needed for agility, while conformability enables fit into confined spaces. Novel actuators could increase control effectiveness for existing naval undersea weapons as well: current actuators use 1970s or 80s hydraulic or electric technology.

Thus, despite the recognition of the potential of high force smart material actuators, and in particular high force smart material actuators, problems remain.

Therefore it is a primary object of the present invention to improve upon the state of the art.

It is a further object of the present invention to convert the low strain of smart materials to large and useful displacements.

It is a further object of the present invention to overcome the limitation of dynamic clamping force.

It is a further object of the present invention to convert oscillating motion into output mechanical power.

It is a further object of the present invention to provide for a system that achieves high efficiencies.

A still further object of the present invention is to provide an actuator capable of high torque.

A further object of the present invention is to provide an actuator capable of high power.

Yet another object of the present invention is to provide an actuator which is not prohibitively expensive.

Another object of the present invention is to provide an actuator that is durable.

A further object of the present invention is to provide an actuator having a high power density.

A still further object of the present invention is to provide an actuator capable of high speeds.

A still further object of the present invention is to provide a bi-directional actuator.

Yet another object of the present invention is to provide a motor capable of conforming with geometric requirements.

Other objects, features, or advantages of the invention will become apparent from the description of the invention and that which follows.

BRIEF SUMMARY OF THE INVENTION

A novel actuator that uses a resonant system with a smart material drive element is disclosed. The actuator includes one or more mechanical diodes in combination with one or more smart materials. The mechanical diode is used to rectify the motion of high frequency resonant oscillation of the smart material drive element, to convert oscillating motion into output mechanical power.

The invention is a combination of smart materials and mechanical diodes in a resonant system to convert oscillating motion and output mechanical power. The invention includes different types of mechanical diodes, different numbers of mechanical diodes, different numbers of drive elements, and different configurations of one or more mechanical diodes in combination with one or more drive elements. The invention includes both linear drive motors as well as rotary drive motors. Mechanical diodes used may be either linear mechanical diodes or rotary mechanical diodes. Furthermore, the mechanical diodes may be either uni-directional or bi-directional.

DETAILED DESCRIPTION OF THE INVENTION

The invention is an actuator or motor that uses mechanical diodes in a dynamic mode. Drive elements of smart materials, such as piezoelectric materials, are combined with mechanical diodes in a resonant system driven with electronics that exploit this resonant condition to achieve high efficiencies.

Figure 1A:
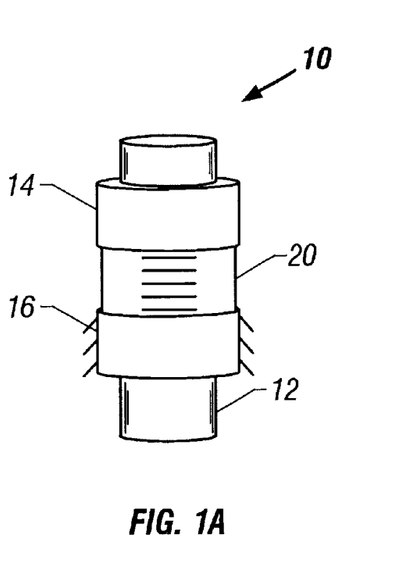
FIG. 1A is a diagram of a linear motor of the present invention.
Figure 1B:
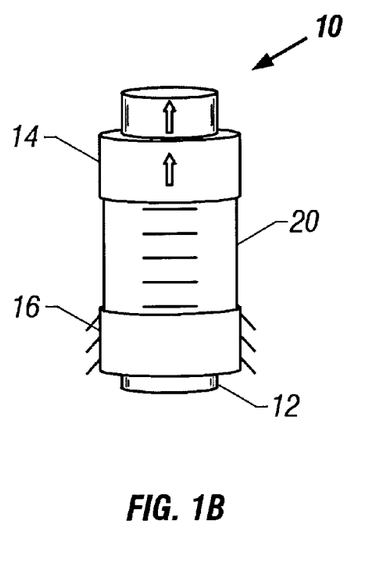
FIG. 1B is a diagram of a linear motor of the present invention during the drive stroke.
Figure 1C:
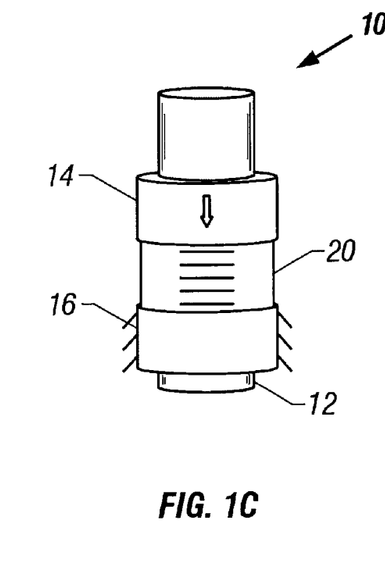
FIG. 1C is a diagram of a linear motor of the present invention during the recovery stroke.

In FIGS. 1A–1C, a linear motor 10 is shown having a mechanical diode 14 that is used to rectify the motion of high frequency resonant oscillation of a drive element 20. The drive element 20 is a smart material such as piezoelectric, electrostrictive, magnetostrictive, shape memory alloy, electromagnetic, or others. The drive element is driven with a signal such as a simple oscillatory signal. In FIGS. 1A–1C, the linear motor 10 drives a shaft 12 to deliver mechanical power to a load (not shown). In FIG. 1A–1C, fixed mechanical diode 12 is fixed in location to prevent backdriving. Working mechanical diode 14 moves. The linear motor 10 as configured permits relative motion of the shaft only in the upward direction.

In FIG. 1A, an initial position is shown. In FIG. 1B, the drive stroke of the linear motor 10 is shown. In the drive stroke, the drive element 20 extends, and the working mechanical diode 14 drives the shaft 12 upward. FIG. 1C illustrates the recovery stroke of the linear motor 10. During the recovery stroke, the drive element 20 retracts and the fixed mechanical diode 16 prevents backdriving of the shaft 12. The inventors have built a high-torque, low-speed, direct drive rotary motor that operates on this principle using a PZT drive element. Initial experiments and subsequent systems analyses indicate a technical path to motor specific powers that exceed 2000 W/kg.

Figure 2:
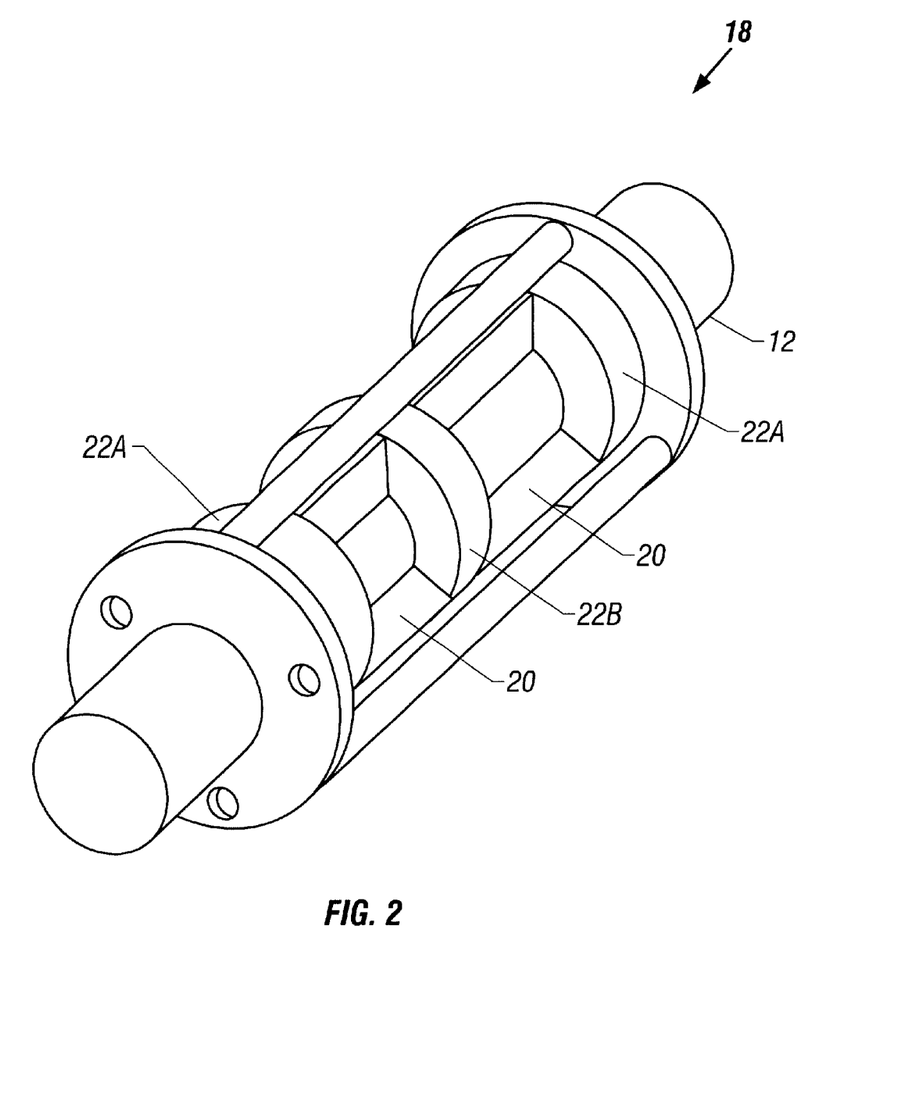
FIG. 2 is a diagram of a stacked linear drive motor of the present invention.

FIG. 2 illustrates a compact linear actuator 18 using bi-directional mechanical diodes 22. The compact linear actuator 18 shown has three bi-directional mechanical diodes 22 although the present invention contemplates that other numbers may be used in a particular configuration. The compact linear actuator 18 shown has two fixed mechanical diodes 22a that are the outer mechanical diodes and a center working mechanical diode 22b. The drive elements 20 shown are linear drive elements such as 3-3 piezo stacks. The working center bi-directional mechanical diode 22 and the drive elements 20 together form a mass/spring oscillator that is driven at resonance. The configuration of the compact linear actuator 18 of FIG. 2 allows total output power to be increased over a linear actuator using two mechanical diodes and a single drive element.

Figure 3:
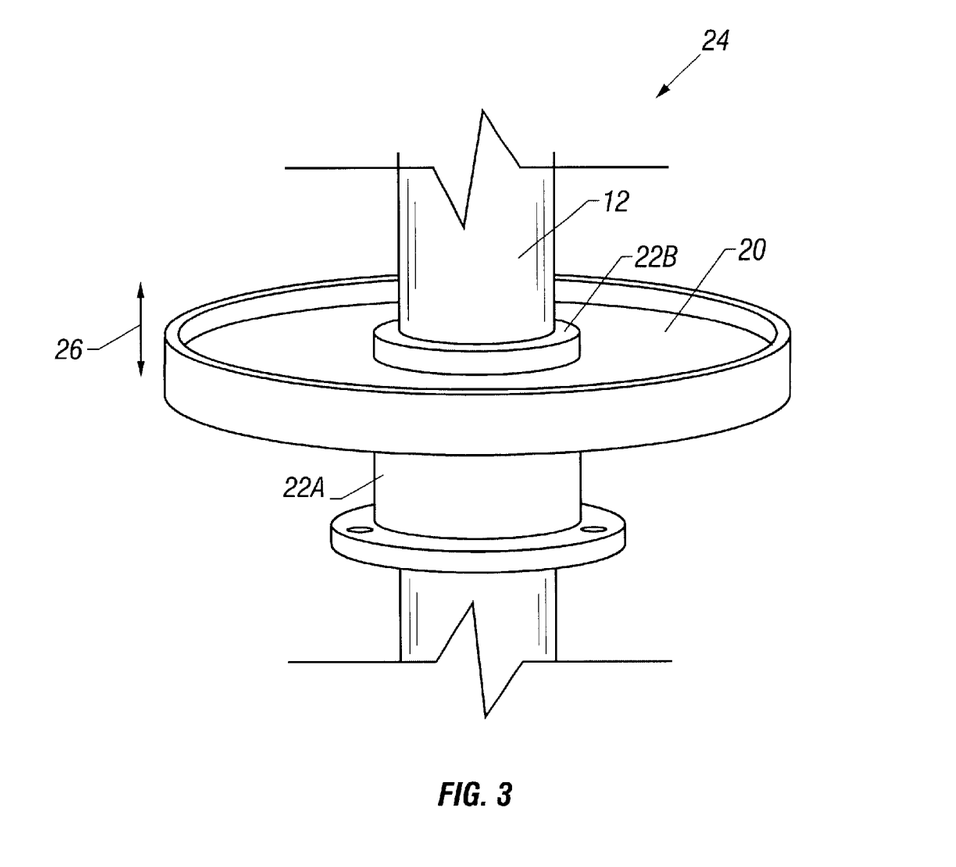
FIG. 3 is a diagram of another embodiment of a linear actuator of the present invention.

FIG. 3 shows a compact rotary actuator 24. In FIG. 3, two linear mechanical diodes 22 are shown. The drive element 20 is shown as a PZT bimorph sheet, although other smart material sheets may be used in this configuration. The working linear mechanical diode 22b moves in the directions indicated by arrow 26 in order to drive the shaft 12.

Figure 4:
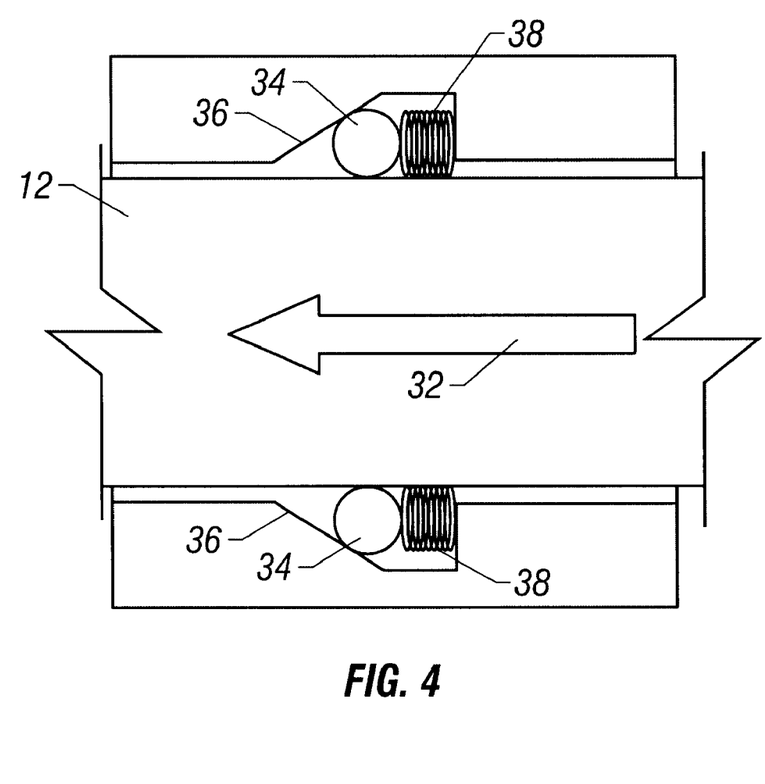
FIG. 4 is a diagram of a linear mechanical diode of the present invention.

Central to all linear actuator or motor concepts is a linear mechanical diode that rectifies oscillatory motion of a driving element. FIG. 4 illustrates one mechanical diode of the present invention. As shown in FIG. 4, a cylindrical roller 34 is pressed by a spring 38 into a wedge 36 created by non-parallel surfaces. Using direct mechanical interference for uni-directional holding eliminates the need for precision machining and reduces reliance on friction. With good design, holding loads can be carried efficiently as hoop stresses. Although uni-directional linear mechanical diodes such as may be known in the prior art may be used in the present invention, bi-directional linear mechanical diodes provide for reversible direct drive.

Figures 5A, 5B:
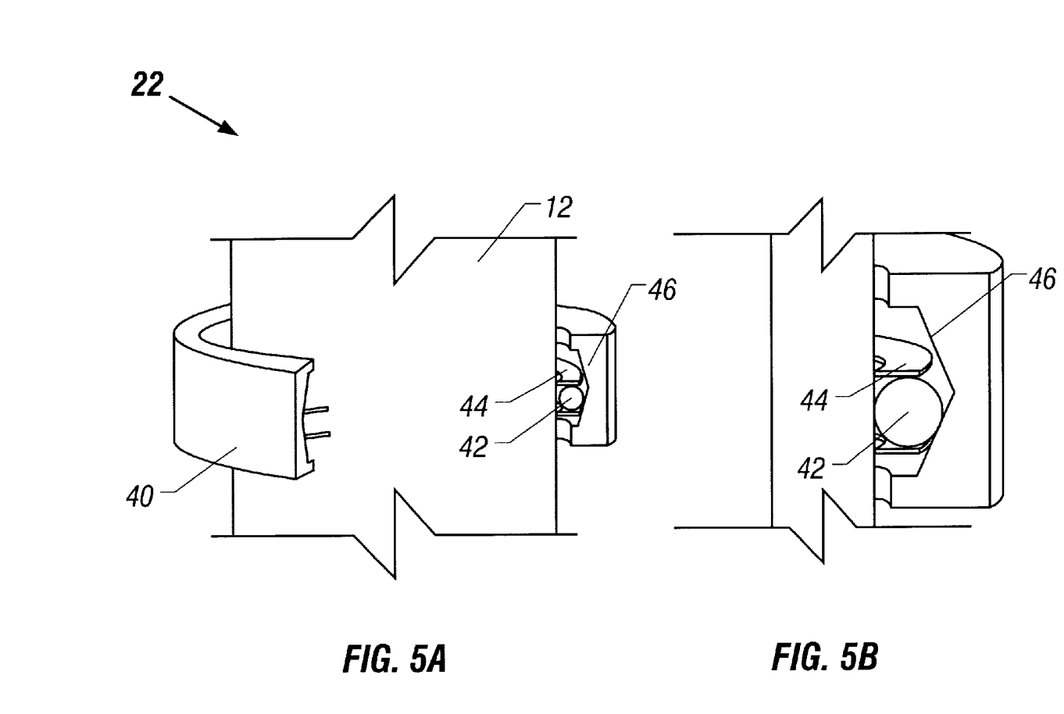
FIGS. 5A–5C is a diagram of a bi-directional linear mechanical diode of the present invention.
Figure 5C:
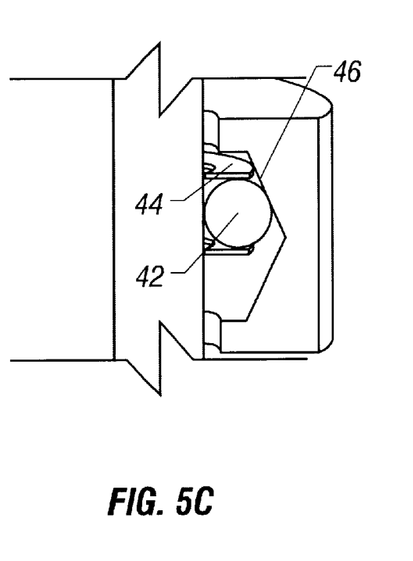

FIGS. 5A–5C illustrate a bi-directional linear mechanical diode of the present invention. A bi-directional mechanical diode enables reversible motion without sophisticated gear trains that add mass and reduce efficiency. The basic improvement needed to create a bi-directional linear mechanical diode is a ramp surface in the outer race that allows a roller to wedge in two places. As shown in FIGS. 5A–5C, the force that pre-loads a roller 42 into a narrowing ramp 46 would be reversed to toggle the wedge position. One toggling mechanism is a bi-stable active spring element 44. It should be appreciated that the speed of such a toggling mechanism can limit the large amplitude bandwidth of an actuator.

Figure 6:
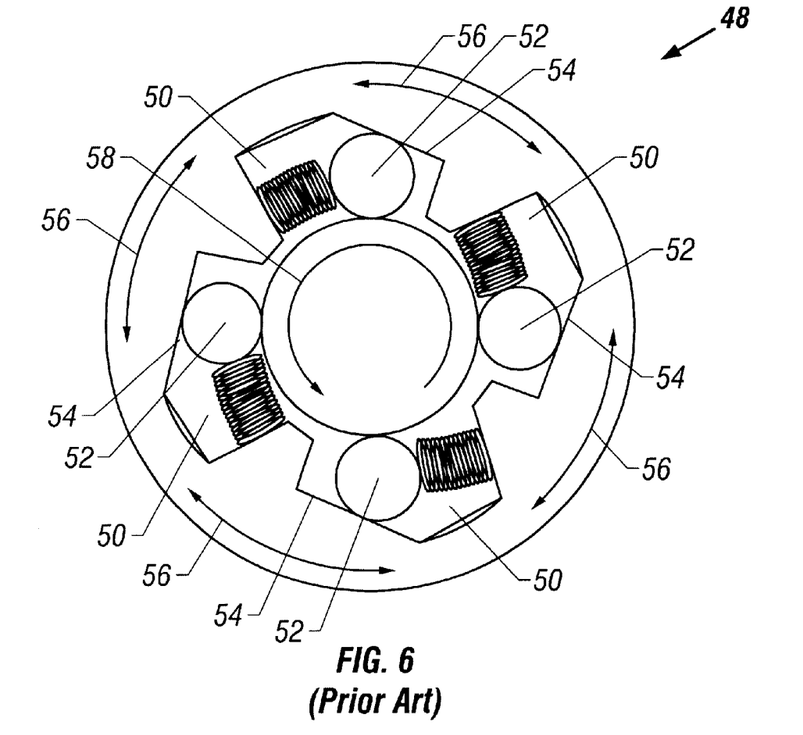
FIG. 6 is a diagram of a rotary mechanical diode of the present invention.

FIG. 6 illustrates a rotary mechanical diode 48 that may be used in the present invention. The rotary mechanical diode or roller clutch is commercially available such as from Torrington. In the rotary mechanical diode, a cylindrical roller 52 is pressed by a spring 50 into a wedge 54 created by non-parallel surfaces. The rotary mechanical diode 48 may rotate in either direction as indicated by arrow 56.

Figure 7:
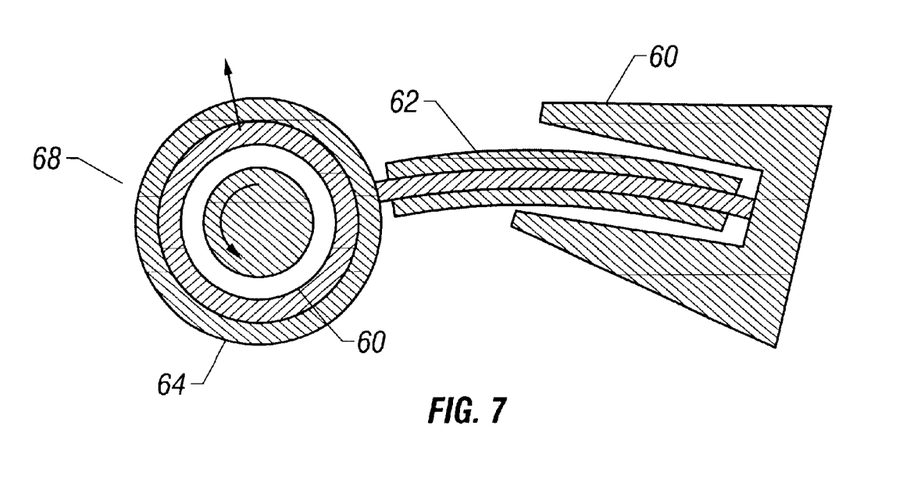
FIG. 7 is a diagram of a bimorph actuator used as an rotary motion generator.

A rotary embodiment of the present invention uses a mechanism for generating a high displacement oscillation of the clutch housing. PZT stacks may be used to drive the clutch housing, either directly or through a mechanical motion amplifier. Alternatively, bimorph actuators are used instead of stacks. In FIG. 7, a bimorph actuator 62 is shown. The bimorph actuator 62 has two active element areas such as two ceramic (PZT) plates bonded to an elastic central metallic sheet. When ceramic plates are used, the ceramic plates are poled in the "3" (thickness) direction so that when an electric field is applied, the top and bottom PZT plates expand and contract, respectively, to bend the beam. Bimorph beams are inexpensive to make, and are widely used in high speed, low displacement positioning applications. Since the force associated with the bending is low, however, bimorphs have generally not been used in high force applications or piezoelectric motors.

To generate a useful high force oscillation, the bimorph actuator is cantilevered from a central hub 64 containing a roller clutch as shown in FIG. 7. A mass 60 attached to the free end of the bimorph serves as a sort of proof mass for the bimorph to push against when excited at resonance. When the bimorph is driven with a voltage signal at the second cantilevered bending resonance frequency, the beam bends back and forth. This bending imparts an angular input to the central hub 64, which is then rectified with the roller clutch to rotational output of the shaft.

Figure 8:
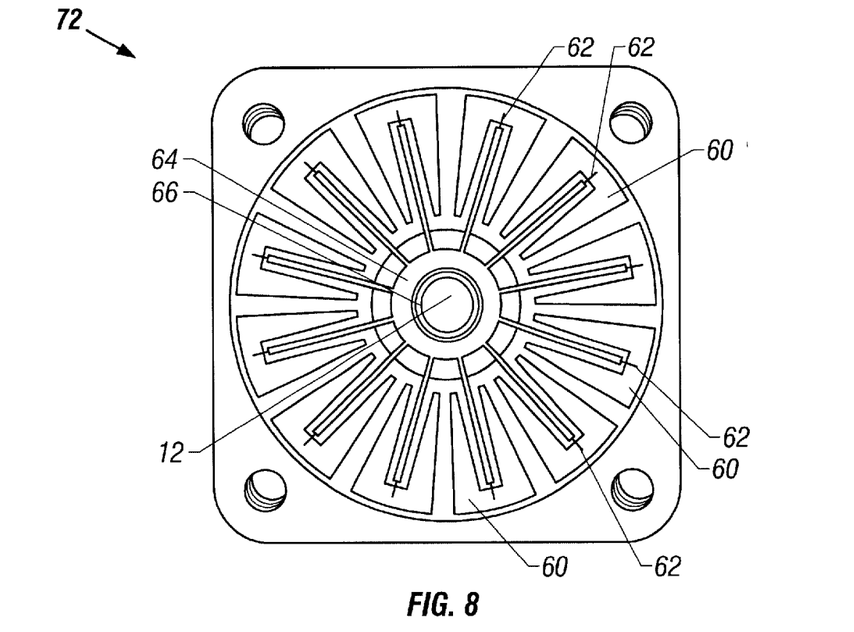
FIG. 8 is a diagram of the resonant roller wedge actuator of the present invention.

In an initial prototype, a single bimorph/mass arm was used to oscillate a hub 64 containing a roller clutch 66. At the second resonant mode (approximately 1 kHz), rotation of the drive shaft 12 was generated at a speed of approximately 5 RPS. The stall torque for a single bimorph drive element was approximately 50 N-mm. The full roller wedge actuator prototype was constructed. In FIG. 8, the roller wedge actuator 72 contains twelve bimorph actuator beams spaced evenly around a central hub. Each beam 62 is manufactured to be identical so that the resonance frequencies of the twelve beams match. This way, a single frequency drive signal will simultaneously excite all of the bimorph beams, transmitting the maximum amount of motion (hence, force) to the hub 64. There are three major advantages to the resonant roller wedge actuator over stack-driven designs. First, the device can be relatively inexpensive. In previous inchworm-type and stack driven actuator designs, the PZT stacks were the most expensive components. The cost of a set of bimorph beam actuators is minimal in comparison, and makes the possibility of mass-producing a line of inexpensive piezoelectric rotary motors realistic. Second, the resonant drive of the bimorph design results in better efficiency, and also requires only a single drive signal and power amplifier. Third, the twelve resonant beam system has a built-in redundancy, i.e., if one bimorph arm were to fail, the others would still be functional. This results in only a slight loss of power, instead of a total shutdown as with the PZT stacks.

Figure 9:
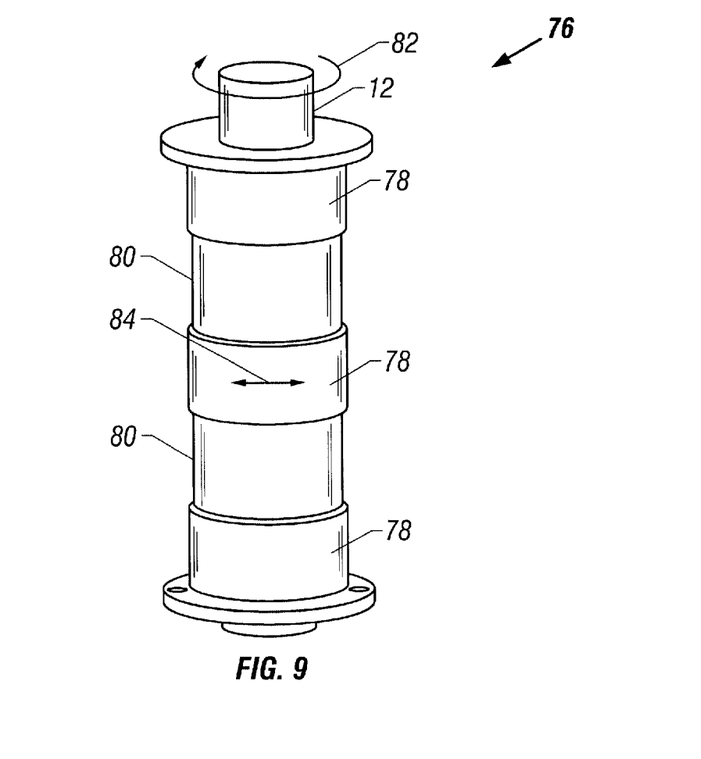
FIG. 9 is a diagram of a compact rotary actuator using mechanical diodes.

FIG. 9 illustrates a compact rotary actuator 76 using mechanical diodes. In FIG. 9, three rotary mechanical diodes 78 are used. In this configuration, two torsional drive elements 80 are used, the drive elements 80 spaced between the rotary mechanical diodes 78. The shaft 12 rotates in the direction indicated by arrow 82.

Figure 10:
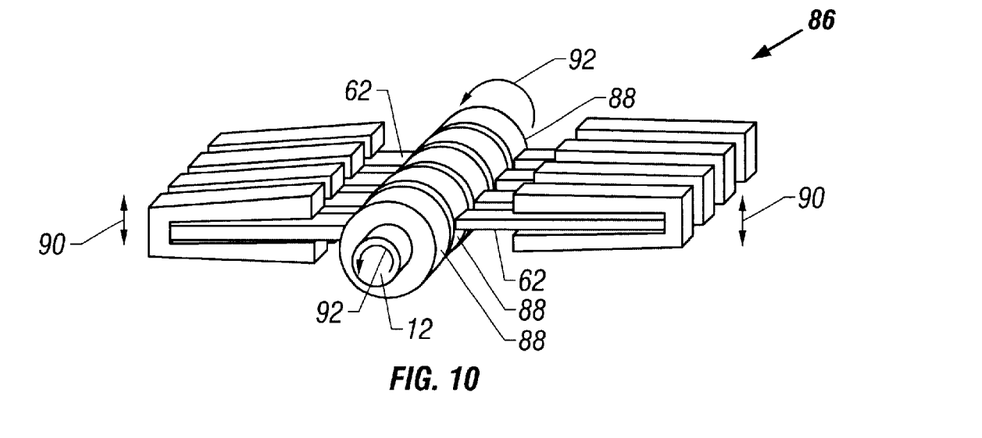
FIG. 10 is a diagram of a compact rotary actuator of the present invention using mechanical diodes and bimorph beams.

FIG. 10 illustrates a compact rotary actuator 86 using bimorph beams. In actuator 86, a number of bi-directional rotary mechanical diodes 88 are shown associated with a shaft 12 that is capable or rotating in the direction indicated by arrows 92. The bimorph beams and masses move in the direction indicated by arrows 90.

Figure 11:
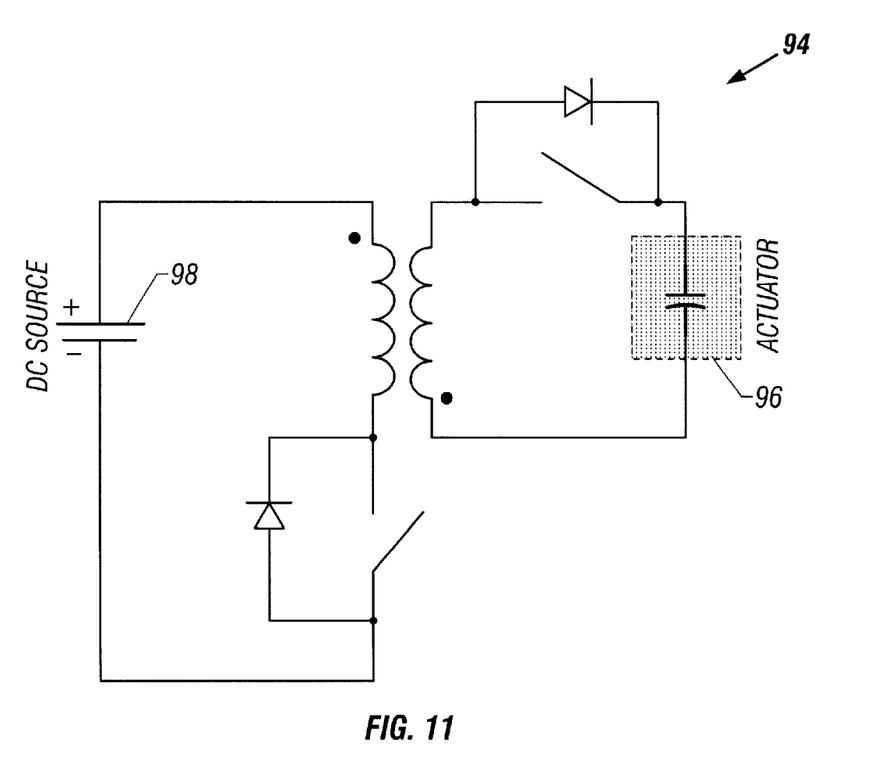
FIG. 11 is a circuit schematic of a signal driving circuit of the present invention.

FIG. 11 illustrates a circuit schematic used to provide a signal to actuators of the present invention. Although numerous circuits can be used, that which is shown is one simple circuit that can be used. Resonant mechanical rectification enables power electronics to be optimized for single-frequency, single-output operation. The driver may be maintained at resonance by a Pierce oscillator circuit, using a feedback sensor and lossy linear amplifiers. FIG. 11 shows an amplifier design based on a DC-to-DC flyback switching converter. This amplifier is configured to support two-way power flow, and is capable of efficiency exceeding 90 percent. The converter boosts the input DC voltage by controlling the duty cycle of the gate drive, and is capable of providing very high peak voltages. The duty cycle can be controlled to yield an oscillatory output in the frequency band of interest with a controllable amplitude and, because of the relatively low power and bandwidth needed, the switching frequency can be very high. High switching frequencies lead to high power densities and more compact electronics.

The power source used is related to the specific application. For example in certain military applications involving small vehicles, a power source is a low voltage DC bus between 10V and 28V. The load presented to the bus typically must meet some specifications. (in the case of aircraft, MilSpec 704E). In certain small vehicle applications considered, the output power can be about 20W. The amplifier can drive the actuator with an amplitude-controlled sinusoidal voltage having a nearly-fixed frequency in the range of 1–10 kHz. For a piezoelectric drive element, this sinusoidal voltage will have a positive DC bias and a maximum swing on the order of ±250V. The present invention fully contemplates other types of oscillating signals at other frequencies and other voltages such as may be required or desirable for a particular type of drive element or for use in a particular application or environment. It is further noted that where efficiency is a primary design concern and because the electrical impedance is primarily reactive, unlike EM motors, the electronics must manage charge regenerated to the amplifier so as to minimize losses.

Another motor embodiment consists of bimorphs extended radially from a central mechanical diode. Instead of attaching to inertial masses, however, the outer bimorph ends are partially fixed to a stiff outer ring by pressing the bimorph ends into an elastomer layer on the outer ring. The elastomer ring provides a boundary condition allowing bending of the bimorph, but resisting lateral movement. Also, the elastomer is easily compressed in the axial direction of the bimorph, which prevents the bimorph from being overly constrained, allowing high resonant amplitudes. By approaching the buckling load of the bimorph by increasing the axial pre-stress, the displacement amplitude, and thus the motor output, can be increased.

The present invention further contemplates other variations using bimorph beams. For example, multiple bimorph beams may be positioned radially around a pair of mechanical diodes or clutches positioned on a shaft. The bimorph beams provide bending and twisting motion when driven by an oscillating signal thereby driving the shaft.

The actuator of the present invention is more conformable than its electromagnetic (EM) counterpart. The active vibration-generating elements can take on a wide variety of geometric configurations to fit a specific application. This type of conformable shape is generally not possible with existing EM motor technology. The present invention contemplates numerous variations in the geometric configurations of the present invention as these variations may be appropriate for a particular application or environment.

The present invention has now been disclosed. The invention is an actuator or motor. The motor may have a shaft delivering mechanical power to load. The motor may have one or more active elements. The active elements may be smart materials such as PZT, magnetostrictives, shape memory alloys, electroactive polymers, magnetic shape memory alloys, and electromagnets, as well as other smart materials such as may be known or may become known. The active elements are driven by an oscillating signal. The present invention contemplates numerous variations in the type of oscillating signal including variations in the frequency and voltage of the signal. The present invention contemplates variations in the number of mechanical diodes used, variations in whether rotary mechanical diodes or linear mechanical diodes are used, variations in whether the mechanical diodes are uni-directional or bi-directional and other variations in the configuration of the actuator. These and other variations are within the spirit and scope of the invention.

What is claimed is:

1. An actuator comprising:
   a shaft for delivering mechanical power to a load;
   a first active element adapted to be driven by an oscillating signal;
   a first mechanical diode operatively connected to the shaft and the first active element;
   a second mechanical diode operatively connected to the shaft;
   a second active element operatively connected to the shaft and adapted to be driven by the oscillating signal; and
   a third mechanical diode operatively connected to the shaft.

2. The actuator of claim 1 wherein the first active element and the second active element are composed of a smart material.

3. The actuator of claim 2 wherein the smart material is selected from the set comprising PZT, piezoelectrics, magnetostrictives, shape memory alloys, electroactive polymers, and electromagnets.

4. The actuator of claim 1 wherein the mechanical diodes are linear mechanical diodes.

5. The actuator of claim 4 wherein the linear mechanical diodes are bi-directional.

6. The actuator of claim 1 wherein the mechanical diodes.

7. The actuator of claim 6 wherein the mechanical diodes are roller clutches.

8. The actuator of claim 6 wherein the rotary mechanical diodes are bi-directional.

9. The actuator of claim 1 wherein the active elements are disposed on bimorph beams extending outward from the shaft.

10. The actuator of claim 9 wherein the mechanical diodes are roller clutches.

11. The actuator of claim 9 further comprising a mass operatively connected to each of the bimorph beams.

12. The actuator of claim 1 further comprising an electrical circuit electrically connected to the first active element and the second active element for providing the oscillating signal.

13. The actuator of claim 1 wherein the third mechanical diode is operatively connected to the second active element.

14. An actuator comprising:
   a shaft for delivering mechanical power to a load;
   a plurality of rotary mechanical diodes operatively connected to the shaft;
   a plurality of bimorph beams, each of the plurality of bimorph beams operatively connected to
   one of the plurality of mechanical diodes.

15. The actuator of claim 14 further comprising a plurality of weights, each of the plurality of weights operatively connected to one of the plurality of bimorph beams.

16. An actuator comprising:
a shaft for delivering mechanical power to a load;
a hub operatively connected to the shaft, the hub containing a roller clutch;
a plurality of bimorph beams connected to the hub and extending outwardly therefrom.

17. The actuator of claim 16 further comprising a plurality of weights, each of the plurality of weights operatively connected to one of the plurality of bimorph beams.

18. An actuator comprising:
a shaft for delivering mechanical power to a load;
a first active element adapted to be driven by an oscillating signal;
a first mechanical diode operatively connected to the shaft and the first active element,
a second mechanical diode operatively connected to the shaft and the first active element;
a second active element operative connected to the second mechanical diode and adapted to be driven by the oscillating signal; and
a third mechanical diode operatively connected to the shaft and the second active element.

19. The actuator or claim 18 wherein the first active element is a smart material and the second active element are composed of a smart material.

20. The actuator of claim 19 wherein the smart material is selected from the set comprising PZT, piezoelectrics, magnetostrictives, shape memory alloys, electroactive polymers, and electromagnets.

21. The actuator of claim 18 wherein the mechanical diodes are linear mechanical diodes.

22. The actuator of claim 21 wherein the linear mechanical diodes are bi-directional.

23. The actuator of claim 18 wherein the mechanical diodes are rotary mechanical diodes.

24. The actuator of claim 23 wherein the rotary mechanical diodes are bi-directional.

* * * * *